(12) United States Patent
Funaoka et al.

(10) Patent No.: US 11,389,907 B2
(45) Date of Patent: Jul. 19, 2022

(54) LASER MACHINING APPARATUS AND LASER MACHINING METHOD

(71) Applicant: Mitsubishi Electric Corporation, Tokyo (JP)

(72) Inventors: Koji Funaoka, Tokyo (JP); Masayuki Saiki, Tokyo (JP); Takayuki Hirano, Tokyo (JP); Hiroaki Ashizawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/280,187

(22) PCT Filed: Dec. 3, 2018

(86) PCT No.: PCT/JP2018/044412
§ 371 (c)(1),
(2) Date: Mar. 26, 2021

(87) PCT Pub. No.: WO2020/115798
PCT Pub. Date: Jun. 11, 2020

(65) Prior Publication Data
US 2021/0308799 A1 Oct. 7, 2021

(51) Int. Cl.
*B23K 26/38* (2014.01)
*B23K 26/03* (2006.01)
(Continued)

(52) U.S. Cl.
CPC .............. *B23K 26/38* (2013.01); *B23K 26/03* (2013.01); *B23K 26/08* (2013.01);
(Continued)

(58) Field of Classification Search
CPC ........ B23K 26/38; B23K 26/03; B23K 26/08; B23K 26/1464; B23K 26/16; B23K 2101/18
(Continued)

(56) References Cited

U.S. PATENT DOCUMENTS

2003/0192867 A1* 10/2003 Yamazaki .............. B23K 26/08
219/121.78
2003/0217809 A1* 11/2003 Morishige .............. B23K 26/03
156/345.5
(Continued)

FOREIGN PATENT DOCUMENTS

JP  62-151091 U  9/1987
JP  2-87575 U  7/1990
(Continued)

OTHER PUBLICATIONS

International Search Report and Written Opinion dated Jan. 22, 2019, received for PCT Application PCT/JP2018/044412, Filed on Dec. 3, 2018, 9 pages including English Translation.
(Continued)

*Primary Examiner* — Jimmy Chou
(74) *Attorney, Agent, or Firm* — Xsensus LLP

(57) ABSTRACT

A laser machining apparatus that separates a workpiece into a machined product and a remnant material by cutting using irradiation with a laser beam includes: a nozzle that squirts gas at a machining point; a rotation mechanism that causes the nozzle or the workpiece to rotate about an optical axis; and a controller that performs control of the rotation mechanism. This control causes the nozzle, which squirts the gas at the machining point, to be at the machined product side during the cutting.

10 Claims, 5 Drawing Sheets

(51) Int. Cl.
*B23K 26/08* (2014.01)
*B23K 26/14* (2014.01)
*B23K 26/16* (2006.01)
*B23K 101/18* (2006.01)

(52) U.S. Cl.
CPC .......... *B23K 26/1464* (2013.01); *B23K 26/16* (2013.01); *B23K 2101/18* (2018.08)

(58) Field of Classification Search
USPC .............................................. 219/68, 121.72
See application file for complete search history.

(56) References Cited

U.S. PATENT DOCUMENTS

| | | | | |
|---|---|---|---|---|
| 2006/0054604 A1* | 3/2006 | Saunders | ............... | B23K 26/08 |
| | | | | 219/121.69 |
| 2008/0127891 A1* | 6/2008 | Dezert | ................ | B23K 26/106 |
| | | | | 118/620 |
| 2009/0084765 A1* | 4/2009 | Muratsubaki | ........ | B23K 26/146 |
| | | | | 219/121.67 |
| 2014/0116997 A1* | 5/2014 | Inoue | .................... | B23K 26/38 |
| | | | | 219/121.67 |
| 2015/0151381 A1* | 6/2015 | Kurosawa | .............. | B23K 26/36 |
| | | | | 219/121.83 |
| 2017/0232558 A1* | 8/2017 | Kano | ................. | B23K 26/0861 |
| | | | | 219/121.72 |
| 2017/0236738 A1* | 8/2017 | Van Lieshout | ... | H01L 21/67092 |
| | | | | 425/174 |
| 2018/0076060 A1* | 3/2018 | Oh | .................... | H01L 21/67248 |
| 2020/0298337 A1* | 9/2020 | Nakamura | ......... | B23K 26/0613 |
| 2021/0086305 A1* | 3/2021 | Mori | ................. | B23K 26/0869 |

FOREIGN PATENT DOCUMENTS

| | | |
|---|---|---|
| JP | 5-329679 A | 12/1993 |
| JP | 8-141764 A | 6/1996 |
| JP | 9-277071 A | 10/1997 |
| JP | 2005-1/1/86 A | 7/2005 |
| JP | 2012-192420 A | 10/2012 |

OTHER PUBLICATIONS

Notification of Reason for Refusal dated Jul. 9, 2019, received for JP Application 2019-518331, 6 pages including English Translation.

Decision to Grant dated Jul. 9, 2019, received for JP Application 2019-518331, 5 pages including English Translation.

* cited by examiner

LASER MACHINING APPARATUS AND LASER MACHINING METHOD

CROSS-REFERENCE TO RELATED APPLICATION

The present application is based on PCT filing PCT/JP2018/044412, filed Dec. 3, 2018, the entire contents of which are incorporated herein by reference.

FIELD

The present invention relates to a laser machining apparatus that cuts a workpiece by irradiating the workpiece with a laser beam and also relates to a laser machining method.

BACKGROUND

In recent years, a fiber reinforced composite material that includes a matrix and reinforcing fibers, such as a carbon fiber reinforced plastic (CFRP), has attracted attention as a high-strength and lightweight material. The fiber reinforced composite material is known for its difficult-to-machine characteristic because the matrix and the reinforcing fiber have different properties. A laser machining apparatus is capable of increasing machining speed by increasing laser power and is therefore sometimes used to machine the fiber reinforced composite material when a high machining speed is required.

In the field of laser machining apparatuses, some laser machining is performed while decomposition products produced during the machining are blown away by squirted gas so as to be prevented from accumulating in a machining area. For example, a laser machining apparatus disclosed in Patent Literature 1 includes a nozzle that squirts gas toward a laser machining position and its proximity. The nozzle of this laser machining apparatus is positionally controlled to be ahead in a cutting direction.

CITATION LIST

Patent Literature

Patent Literature 1: Japanese Patent Application Laid-open No. H05-329679

SUMMARY

Technical Problem

However, when machining is performed on the fiber reinforced composite material, using the technique described in Patent Literature 1; decomposition products produced during the machining adhere to a workpiece, thus problematically causing a decline in machining quality. More decomposition products are produced especially when a high-speed cutting is performed.

Specifically, the matrix and the reinforcing fiber of the fiber reinforced composite material have different melting points from each other, and the melting point of the reinforcing fibers is often higher than the melting point of the matrix. In that case, intensity of a laser beam is adjusted to the melting point of the reinforcing fibers. Therefore, temperatures of the decomposition products are about the same as the melting point of the reinforcing fibers and thus are higher than the melting point of the matrix. In a case, a workpiece made of a single material is laser machined, and the squirted gas lowers temperatures of decomposition products, the temperatures of the decomposition products blown by the squirted gas drop below a melting point of the workpiece, there is no problem with the decomposition products touching the workpiece. In the case of the CFRP, however, carbon fibers have a melting point of 3500 degrees, whereas a resin serving as a matrix has a lower melting point that is about 250 degree. Therefore, causing decomposition products to have lower temperatures than the melting point of the matrix is difficult, and the decomposition products adhere to the matrix upon contact with the workpiece.

The present invention has been made in view of the above, and an object of the present invention is to obtain a laser machining apparatus that is capable of providing improved quality in machining a fiber reinforced composite material.

Solution to Problem

To solve the above problems and achieve the object, a laser machining apparatus according to the present invention separates a workpiece into a machined product and a remnant material by cutting using laser beam irradiation. The laser machining apparatus includes: a nozzle to squirt gas at a machining point; a rotation mechanism to cause one of the nozzle and the workpiece to rotate about an optical axis of a laser beam; and a controller to perform control of the rotation mechanism, the controller causing the nozzle that squirts the gas toward the machining point from the machined product side during the cutting.

Advantageous Effect of Invention

The laser machining apparatus according to the present invention is capable of providing an improved quality in machining a fiber reinforced composite material.

DESCRIPTION OF EMBODIMENT

With reference to the drawings, a detailed description is hereinafter provided of a laser machining apparatus and a laser machining method according to an embodiment of the present invention. It is to be noted that this embodiment is not restrictive of the present invention.

First Embodiment

Figure 1:
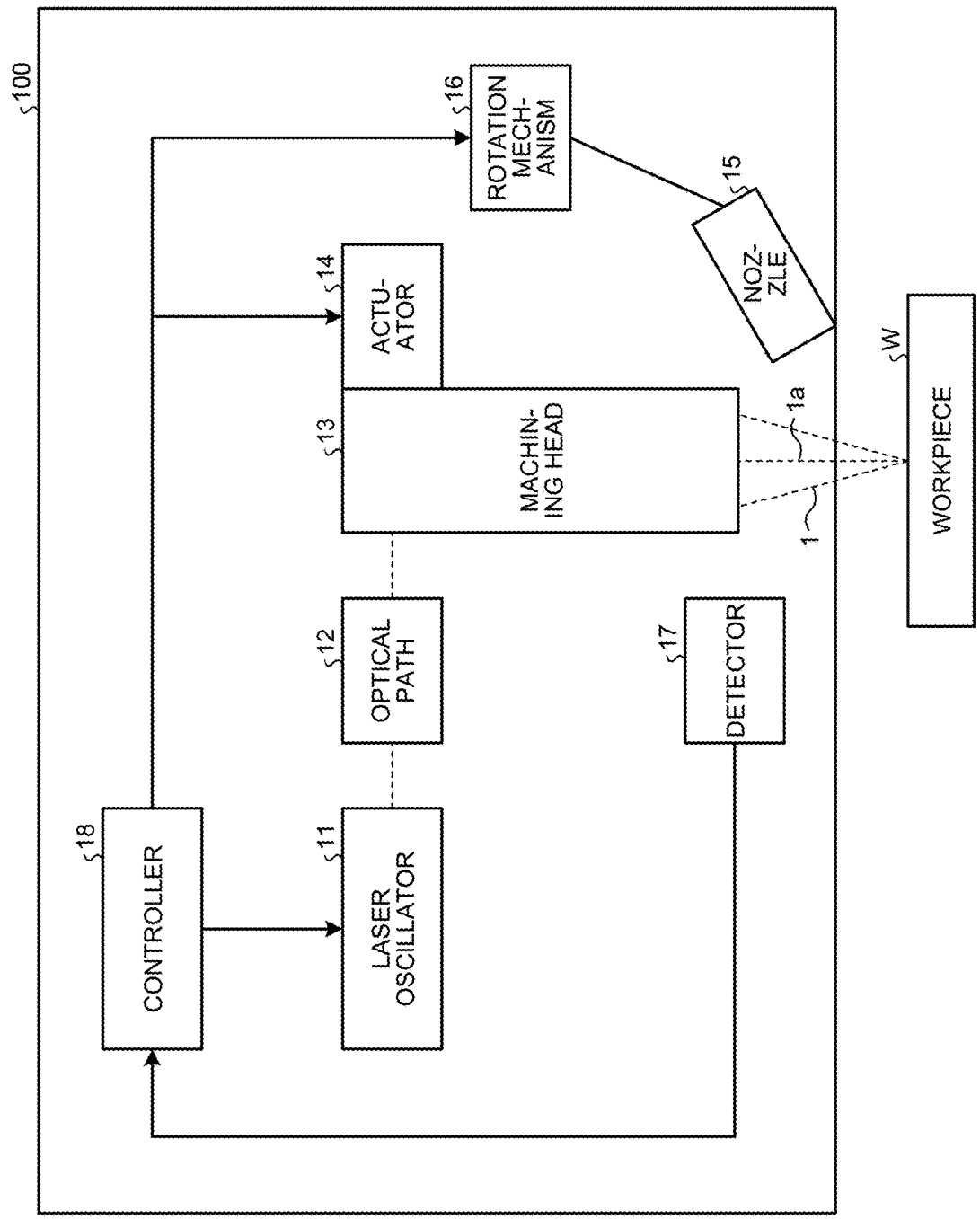
FIG. 1 illustrates a functional configuration of a laser machining apparatus according to a first embodiment of the present invention.

FIG. 1 illustrates a functional configuration of a laser machining apparatus 100 according to the first embodiment of the present invention. The laser machining apparatus 100 includes: a laser oscillator 11; an optical path 12; a machining head 13; an actuator 14; a nozzle 15; a rotation mechanism 16; a detector 17; and a controller 18.

The laser machining apparatus 100 functions to cut a workpiece W by irradiating the workpiece W with a laser beam 1. The workpiece W is a fiber reinforced composite material including a matrix and reinforcing fibers. A CFRP is an example of the fiber reinforced composite material. In this example, reinforcing fibers are carbon fibers ranging in diameter from 5 to 10 micrometers, and the matrix is a thermosetting resin as represented by an epoxy resin. Compared with the resin having a thermal conductivity of 0.3 W/m·K, the carbon fibers have a high thermal conductivity ranging from 100 to 800 W/m·K. Compared with the resin having a melting point of 250 degrees, the carbon fibers have a high melting point ranging from 2000 to 3500 degrees.

The laser oscillator 11 emits the oscillated laser beam 1. Examples of the laser oscillator 11 include a fiber laser oscillator, a carbon dioxide laser, a solid-state laser using, for example, an yttrium aluminum garnet (YAG) crystal as an excitation medium, and a direct diode laser, among others.

The laser beam 1 emitted from the laser oscillator 11 is supplied to the machining head 13 along the optical path 12. Extending to the machining head 13, the optical path 12 is a transmission path for the laser beam 1 emitted from the laser oscillator 11 and may be a path along which the laser beam 1 is transmitted through the air or an optical fiber. The optical path 12 is designed depending on characteristics of the laser beam 1.

The machining head 13 includes an optical system that focuses the laser beam 1 to the workpiece W. The machining head 13 irradiates the workpiece W with the supplied laser beam 1. The optical system included in the machining head 13 preferably provides a focal point near a surface of the workpiece W.

The actuator 14 is capable of variably controlling a relative positional relationship between the machining head 13 and the workpiece W. The actuator 14 of the laser machining apparatus 100 shifts the machining head 13 to change the relative positional relationship between the machining head 13 and the workpiece W. However, the actuator 14 may shift a table on which the workpiece W is placed or may shift both the machining head 13 and the table that the workpiece W is placed on. In other words, the actuator 14 should function to shift at least one of the machining head 13 or the workpiece W.

While the actuator 14 changes the relative positional relationship between the machining head 13 and the workpiece W, the machining head 13 irradiates the workpiece W with the laser beam 1. This enables cutting of the workpiece W.

The nozzle 15 is a gas jet nozzle that squirts gas toward a machining point. The machining point is a point where the workpiece W is irradiated with the laser beam 1 emitted from the machining head 13 and can be said to be a point of intersection between an optical axis 1*a* of the laser beam 1 and the workpiece W. The nozzle 15 squirts the gas toward the optical axis 1*a* from the outside of the optical axis 1*a*. The position of the nozzle 15 is varied by the rotation mechanism 16 that causes the nozzle 15 to rotate about the optical axis 1*a*. A rotation axis of the nozzle 15 is aligned with the optical axis 1*a*. The rotation mechanism 16 causes the nozzle 15 to rotate about the optical axis 1*a* in a state a leading end of the nozzle 15 is facing the optical axis 1*a*.

The detector 17 is a sensor that detects a state of the workpiece W or a state of the laser machining apparatus 100. The detector 17 performs measurement of a position of the workpiece W being machined, and performs measurements of light intensity and wavelength, sound wave or ultrasonic wave generated during machining having a physical quantity in the form of a time-series signal. Examples of the detector 17 include: a capacitive sensor; a photodiode; a charge-coupled device (CCD) sensor; a complementary metal-oxide-semiconductor (CMOS) sensor; a spectroscope; an acoustic sensor; an acceleration sensor; a gyroscope sensor; a distance sensor; a position sensor; a temperature sensor; a humidity sensor; and the like. The detector 17 inputs the time-series signal indicating the measurement to the controller 18.

In accordance with preset machining conditions, the controller 18 controls those including the laser oscillator 11, the actuator 14, and the rotation mechanism 16 so that the laser beam 1 scans along a machining path on the workpiece W. The machining conditions include, for example, a material, a thickness, and a surface condition, of the workpiece W. The machining conditions further include: laser output intensity of the laser oscillator 11; a laser output frequency; a duty ratio of laser output; a mode; a waveform; a wavelength; and the like. The machining conditions may include: a focal position of the laser beam 1; focused light diameter of the laser; a type of gas to be squirted by the nozzle 15; a gas pressure; a nozzle hole diameter; and a machining speed. The machining conditions may also include measurements that are input from the detector 17, such as a distance between the workpiece W and the machining head 13, a temperature, and humidity.

Figure 2:
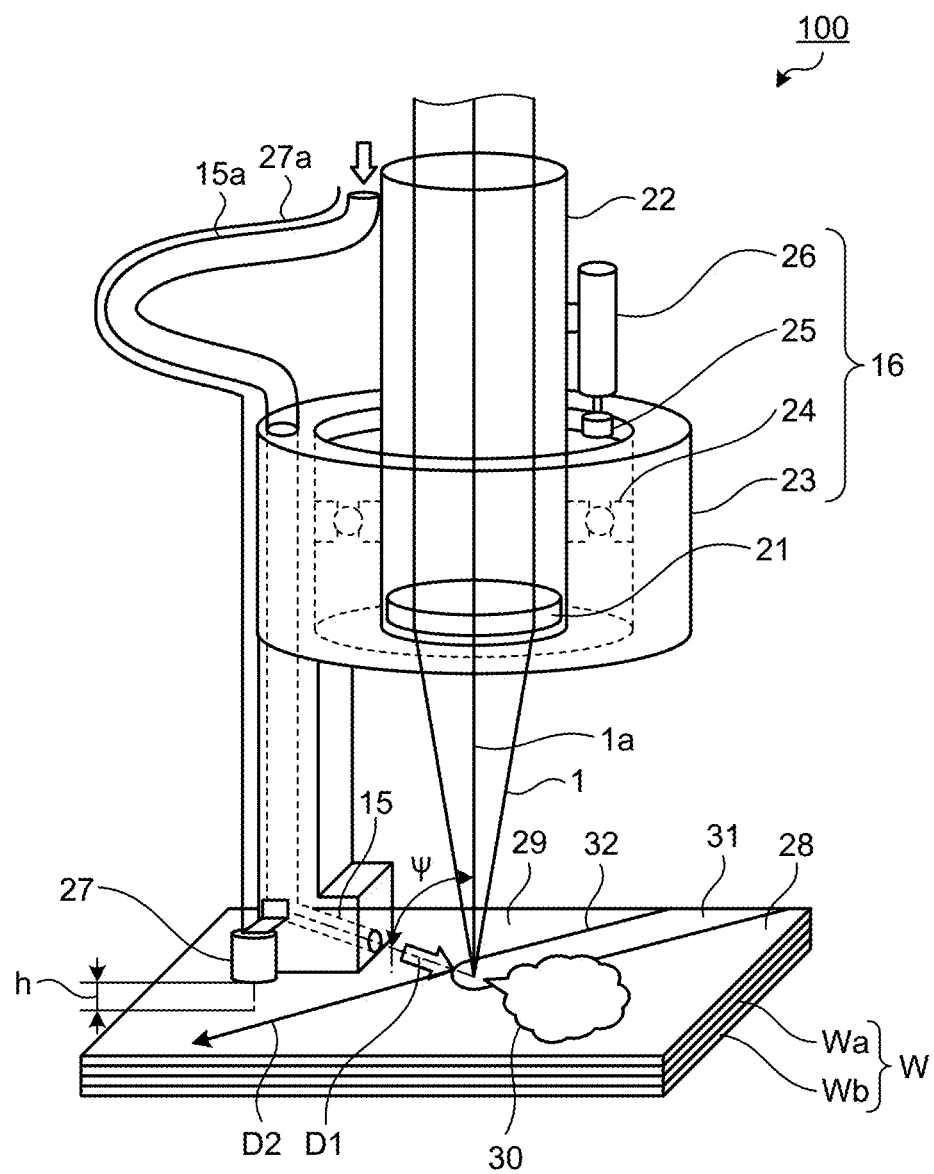
FIG. 2 illustrates a configuration example of hardware of the laser machining apparatus illustrated in FIG. 1.

FIG. 2 illustrates a configuration example of hardware of the laser machining apparatus 100 illustrated in FIG. 1. The workpiece W here is the fiber reinforced composite material including the carbon fibers Wa, which are the reinforcing fibers, and the resin Wb, which is the matrix. Suppose that the surface of the workpiece W is an XY plane, with a Z-axis being perpendicular to the XY plane. An irradiation direction of the laser beam 1 is horizontal with the Z-axis.

An optical unit 22 is a part of the machining head 13 illustrated in FIG. 1 and includes a converging lens 21 that causes the laser beam 1 to converge to the machining point. The nozzle 15 is fixed to the rotation mechanism 16. The rotation mechanism 16 includes a frame 23, a bearing 24, a gear 25, and a servomotor 26. The frame 23 of the rotation mechanism 16 is rotatably supported by the optical unit 22 via the bearing 24. A rotation center of the rotation mechanism 16 is aligned with the optical axis 1*a*. The gear 25 is rotated by the servomotor 26, thus enabling the rotation mechanism 16 to position the nozzle 15 at any rotational angle. A control signal is input from the controller 18 to the servomotor 26 of the rotation mechanism 16. The servomotor 26 operates in accordance with the control signal, thus enabling positioning control of the nozzle 15.

Wherever the nozzle 15 is, the leading end of the nozzle 15 faces the machining point on the optical axis 1*a*. This means that the squirting-direction-of-the-gas (D1) faces the machining point. An angle Ψ formed by a direction of the nozzle 15, namely, by a squirting direction-of-the-gas (D1) and the optical axis 1*a* is greater than 0 degrees and less than 90 degrees. A hose 15*a* is connected to the nozzle 15 to supply the gas to be squirted from the leading end of the nozzle 15. The hose 15*a* is long enough to allow one positive or negative rotation of the nozzle 15.

The nozzle 15 is provided with a gap sensor 27 that measures a distance h between the workpiece W and the gap sensor 27. The higher the concentration of the laser beam 1 is in cutting the fiber reinforced composite material, the faster the cutting can be, and the higher the quality of the cutting can be. However, a highly concentrated beam has a shallow depth of focus. Therefore, highly accurate gap control, that is to say, control that keeps the distance h between the workpiece W and the gap sensor 27 constant is required. Examples of the gap sensor 27 include a capacitive sensor, a contact sensor, and an eddy current sensor. The gap sensor 27 rotates about the optical axis 1a integrally with the nozzle 15. A sensor cable 27a is connected to the gap sensor 27. The sensor cable 27a is connected to the controller 18 illustrated in FIG. 1 and supplies, to the controller 18, a time-series signal indicating a measurement of the gap sensor 27. On the basis of the measurement, the controller 18 performs height control of the optical unit 22 along the optical axis in order for the distance h between the workpiece W and the gap sensor 27 to remain constant. As with the hose 15a, the sensor cable 27a is long enough to allow one positive or negative rotation of the nozzle 15.

The laser machining apparatus 100 performs cutting that separates the workpiece W into a machined product 29 and a remnant material 28 by irradiating the workpiece W with the laser beam 1. After the cutting, the machined product 29 is a portion used as a component or the like, while the remnant material 28 becomes unneeded portion. Under the control of the controller 18, the point where the workpiece W is irradiated with the laser beam 1 shifts along the machining path. In FIG. 2 illustrating the cutting in progress, the machining path is defined by a cut groove 31 formed in an already machined portion of the workpiece W, and a traveling-direction-of-the-laser beam 1 (D2).

Figure 3:
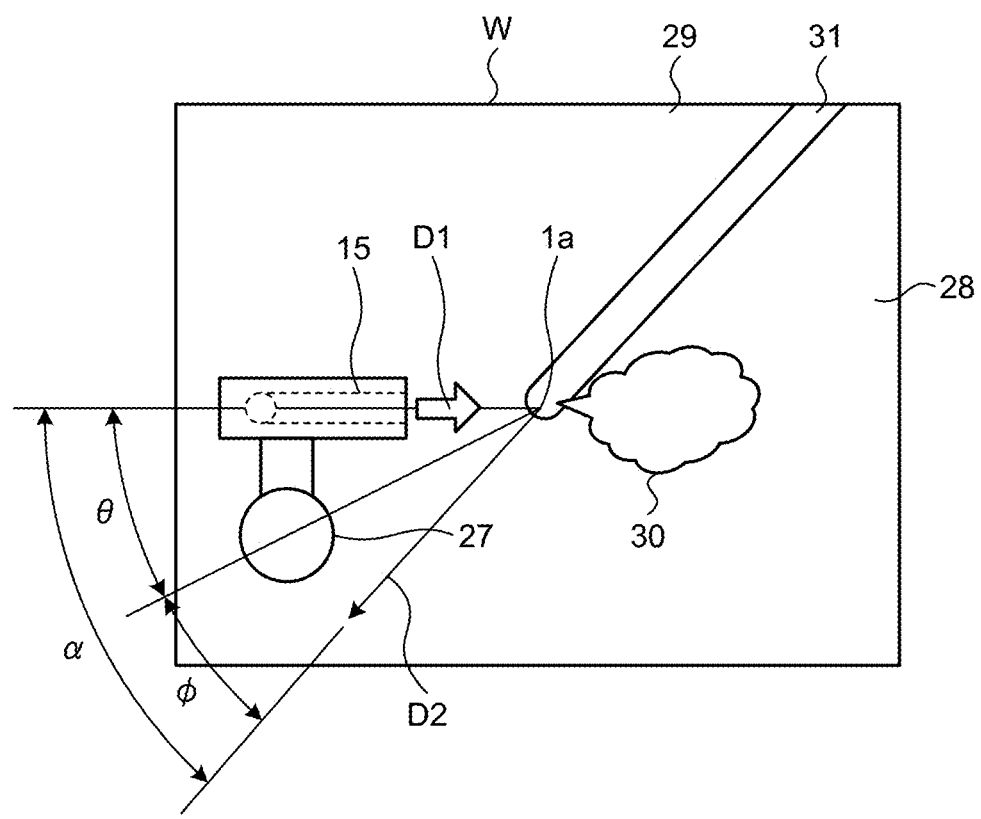
FIG. 3 is a top view as seen from above in FIG. 2, however illustrations of optical unit, rotation mechanism, sensor cable, and hose are omitted.

FIG. 3 is a top view as seen from above in FIG. 2, however illustrations of optical unit 22, rotation mechanism 16, sensor cable 27a, and hose 15a are omitted. The laser machining apparatus 100 blows away decomposition products 30 produced during the cutting toward the remnant material 28 by controlling the position of the nozzle 15. The controller 18 controls the position of the nozzle 15 so that the nozzle 15 is on a side of the machined product 29 than the machining path. The nozzle 15 faces the machining point on the optical axis 1a wherever the nozzle 15 is, and the optical axis 1a is positioned in the machining path. Therefore, the squirting-direction-of-the-gas (D1) can be directed toward the remnant material 28 by controlling the position of the nozzle 15 to be on the side of the machined product 29 than the machining path. During the cutting, the controller 18 can cause the nozzle 15 to squirt the gas across the machining point toward the remnant material 28 from the side of the machined product 29.

The controller 18 controls the positioning of the nozzle 15 to maintain, in a plane orthogonal to the optical axis 1a, an angle α of greater than 0 degrees and less than 180 degrees between the traveling-direction-of-the laser-beam 1 (D2) and a line extending from the optical axis 1a to the nozzle 15. With the positioning of the nozzle 15 controlled in a way as described above, the decomposition products 30 that belch during the cutting of the fiber reinforced composite material are blown toward the remnant material 28. Thus, adhesion of the decomposition products 30 to the machined product 29, which is needed after the cutting, can be suppressed. With increasing pressure of the gas to be squirted from the nozzle 15, this effect is enhanced, and an effect of removing the decomposition products 30 from the optical axis 1a is also enhanced. Controlling the positioning of the nozzle 15 as described above therefore enables both the removal of the decomposition products 30 from the optical axis 1a and reduced contamination of the surface of the workpiece W after the cutting, so that high-speed and high-quality cutting is achievable.

In the plane orthogonal to the optical axis 1a, an angle θ formed by the line extending from the optical axis 1a to the nozzle 15 and a line extending from the optical axis 1a to the gap sensor 27 is less than 90 degrees. While the laser machining apparatus 100 cuts the CFRP, some of the carbon fibers Wa may belch from the machining point together with the decomposition products 30 due to insufficient thermal decomposition. Since the carbon fibers Wa are conductive, entry of those carbon fibers Wa into the space between the gap sensor 27 and the workpiece W causes a significant change in capacitance, thus leading to a decline in measuring accuracy. Accordingly, the gap sensor 27 is positioned on an upstream side of a gas flow compared with the machining point, with the angle θ being less than 90 degrees. This configuration suppresses the entry of the carbon fibers Wa into the space between the gap sensor 27 and the workpiece W, thus enabling highly accurate measurement of the distance h between the workpiece W and the gap sensor 27. Therefore, high-speed and high-quality cutting using a favorably concentrated beam is achievable.

When the gap sensor 27 is of the contact type, an accumulation of the decomposition products 30 adhering to the gap sensor 27 causes a corresponding offset value to be detected. Moreover, when the gap sensor 27 is of the eddy current type, adhesion of the carbon fibers Wa, which are conductive, to the gap sensor 27 causes to a measurement error. The angle θ of less than 90 degrees enables the adhesion of the decomposition products 30 to the gap sensor 27 to be suppressed, so that high-speed and high-quality cutting is achievable.

During the cutting, the controller 18 controls the rotation mechanism 16 to maintain, in the plane orthogonal to the optical axis 1a, an angle Φ of less than 90 degrees between the traveling-direction-of-the laser-beam 1 (D2) and the line extending from the optical axis 1a to the gap sensor 27. Cutting the CFRP with the laser machining apparatus 100 can cause cut ends 32 of the carbon fibers Wa to project into the cut groove 31 as illustrated in FIG. 2. Since the carbon fibers Wa are conductive, the gap sensor 27 of the capacitive type may have a reduced measuring accuracy near the cut ends 32. Moreover, a depression like the cut groove 31 can be a factor contributing to a measurement error of the gap sensor 27. By maintaining the angle Φ of less than 90 degrees, the controller 18 is capable of positioning the gap sensor 27 ahead of the machining point in the traveling-direction of-the-laser-beam 1 (D2), that is to say, in the traveling-direction-of-the-cutting (D2). Therefore, without being affected by the projecting cut ends 32 of the carbon fibers Wa in the cut groove 31, the gap sensor 27 is enabled to measure the distance h at a flat portion not including the cut groove 31, so that prevention of the measurement error is achievable. Consequently, the controller 18 is capable of achieving a highly accurate gap control, and the laser machining apparatus 100 is capable of achieving a high-speed and high-quality cutting.

Figure 4:
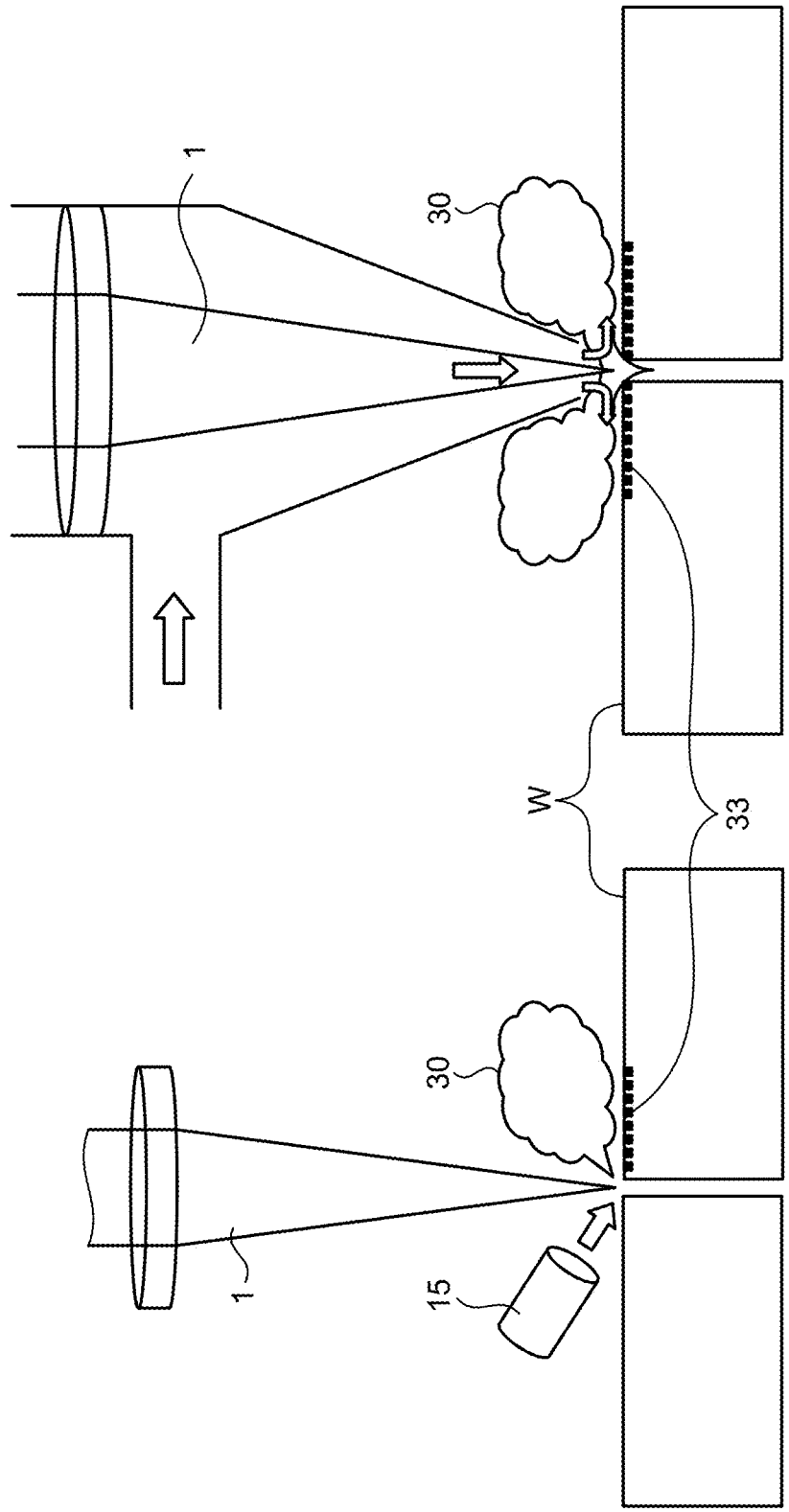
FIG. 4 illustrates an advantageous effect of the laser machining apparatus illustrated in FIG. 2.

FIG. 4 illustrates an advantageous effect of the laser machining apparatus 100 illustrated in FIG. 2. Part (a) of FIG. 4 illustrates an example in which the squirting gas is externally applied in the direction of the optical axis 1a by means of the nozzle 15, which is a side flow nozzle, as in the laser machining apparatus 100 illustrated in FIG. 2. Part (b) of FIG. 4 illustrates a comparative example commonly used for sheet metal cutting. In this comparative example, the gas is squirted along the optical axis 1a toward a machining point by an axial flow nozzle.

In the case of the axial flow nozzle, some of the decomposition products 30 that have shot up are forced back to the workpiece W and come into contact with the surface of the workpiece W. The axial flow nozzle causes a contact zone 33 where the decomposition products 30 touch the surface of the workpiece W to extend widely over both sides of the machining path. By contrast, the side flow nozzle externally applies the squirted gas in the direction of the optical axis 1a, so that the decomposition products 30 are blown in a single direction. Therefore, controlling the positioning of the nozzle 15 so that the squirting direction-of-the-gas (D1) does not parallel the machining path, but is angled relative to the machining path causes one of those two parts separated by the machining path to have the contact zone 33 but enables the other part to have no contact zone 33.

In the fiber reinforced composite material, the reinforcing fibers have a higher melting point than the matrix, and a difference between the melting points is often large. In the case of the CFRP, for example, the carbon fibers Wa have the melting point of about 3500 degrees, while the resin Wb has the melting point of about 250 degrees as mentioned earlier. In this case, temperature at the machining point is adjusted to the higher melting point during cutting and thus is equal to or more than 3500 degrees. Accordingly, temperatures of the decomposition products 30 also reach 3500 degrees or more. When the temperatures of the decomposition products 30 blown by the squirted gas drop below a melting point of the contact zone 33 by the time the decomposition products 30 come into contact with the surface of the workpiece W, there is no problem with the decomposition products 30 touching the workpiece W. However, with the temperatures of the decomposition products 30 being equal to or more than 3500 degrees, and with the resin Wb having the melting point of about 250 degrees, the temperatures of the decomposition products 30 are less likely to drop below the melting point of the resin Wb by the time the decomposition products 30 come into contact with the workpiece W. Therefore, when the workpiece W is the fiber reinforced composite material, its surface is processed at the contact zone 33 and thus becomes contaminated.

Decreasing the squirting gas pressure of the nozzle 15 enables reduced contamination of the surface of the workpiece W; however, the decomposition products 30 convect on the optical axis 1a and scatter and absorb the laser beam 1, thus causing a decline in machining quality and a decline in machining speed. When the gas pressure is increased to, for example, 0.1 MPa or more, the effect of removing the decomposition products 30 from the optical axis 1a is enhanced; however, the contact zone 33 increases in area.

Accordingly, the rotation mechanism 16 is controlled to position the nozzle 15, which squirts the gas in the direction of the optical axis 1a, on the side of the machining path that becomes the machined product 29 as described in the first embodiment. This enables the remnant material 28 to have the contact zone 33 where the decomposition products 30 touch the surface of the workpiece W but enables contact between the decomposition products 30 and the machined product 29 to be suppressed. Since it is the remnant material 28, which becomes unneeded after the cutting, that has the contact zone 33 in this case, the contact zone 33 may increase in area. Therefore, the gas pressure can be increased to increase the machining speed.

Figure 5:
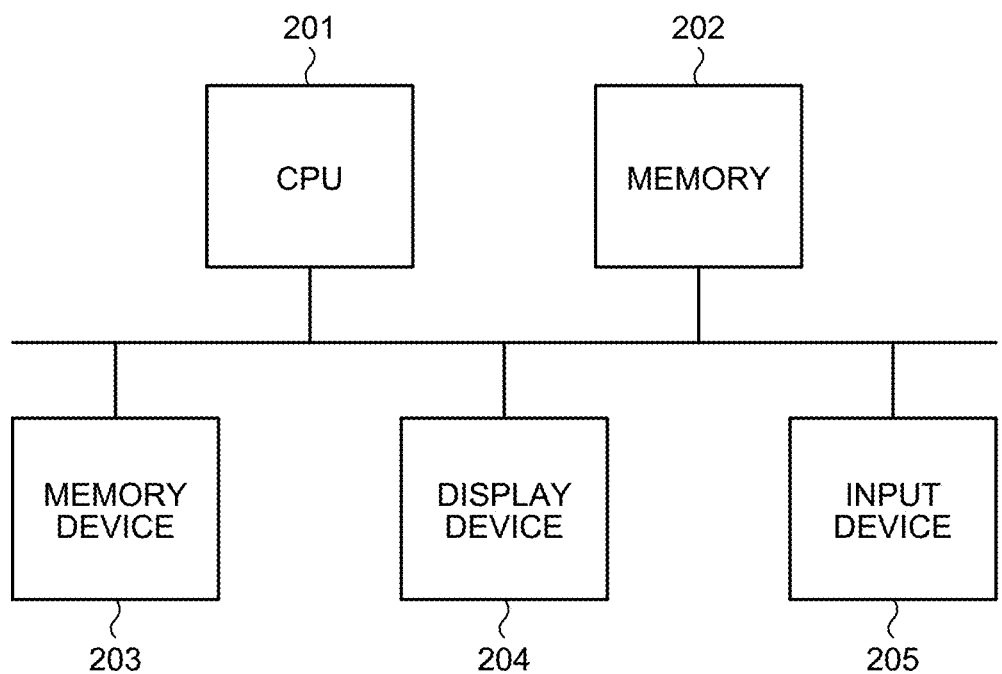
FIG. 5 illustrates a hardware configuration for implementing functions of a controller illustrated in FIG. 1.

FIG. 5 illustrates a hardware configuration for functional implementation of the controller 18 illustrated in FIG. 1. The controller 18 of the laser machining apparatus 100 is functionally implemented by a control device that includes, as illustrated in FIG. 5, a central processing unit (CPU) 201, a memory 202, a memory device 203, a display device 204, and an input device 205. The controller 18 is functionally implemented by use of software, firmware, or a combination of software and firmware. The software or the firmware is described as computer programs and is stored in the memory device 203. The CPU 201 loads the software or the firmware stored in the memory device 203 into the memory 202 and executes the software or the firmware for the functional implementation of the controller 18. This means that when the controller 18 is functionally implemented by the CPU 201, a computer system includes the memory device 203 that stores the programs, which eventually execute steps for operation of the controller 18 that has been described in the first embodiment. These programs can be said to cause a computer to perform processing for the functional implementation of the controller 18. The memory 202 corresponds to a volatile storage area such as a random-access memory (RAM). The memory device 203 corresponds to a nonvolatile or volatile semiconductor memory, such as a read-only memory (ROM) or a flash memory, or a magnetic disk. Specific examples of the display device 204 include a monitor and a display. Specific examples of the input device 205 include a keyboard, a mouse, and a touch panel.

As described above, the laser machining apparatus 100 according to the first embodiment of the present invention includes: the nozzle 15 that externally applies the squirted gas in the direction of the optical axis 1a of the laser beam 1; the rotation mechanism 16 that causes the nozzle 15 or the workpiece W to rotate about the optical axis 1a; and the controller 18 that controls the rotation mechanism 16 during cutting to position the nozzle 15 on the side of the machining (cutting) path that becomes the machined product 29. This configuration causes the nozzle 15, which squirts the gas in the direction of the optical axis 1a, to stay on the side of the machining path that becomes the machined product 29, so that the gas is squirted from the nozzle 15 in the direction D1 of the remnant material 28. Accordingly, the decomposition products 30, which are produced during the cutting, are blown toward the remnant material 28. Consequently, adhesion of the decomposition products 30 to the machined product 29 can be suppressed. Therefore, the machining quality of the fiber reinforced composite material can be improved.

The laser machining apparatus 100 also includes the gap sensor 27 that is fixed to the nozzle 15 for detecting the distance h between the workpiece W and the gap sensor 27. The angle θ formed by the line extending from the optical axis 1a to the nozzle 15 and the line extending from the optical axis 1a to the gap sensor 27 is less than 90 degrees here. This configuration causes the gap sensor 27 to stay on the upstream side of the gas flow compared with the machining point. Accordingly, the entry of the carbon fibers Wa into the space between the gap sensor 27 and the workpiece W is suppressed, and consequently, the highly accurate measurement of the distance h between the workpiece W and the gap sensor 27 is enabled. Therefore, the high-speed and high-quality cutting using the favorably concentrated beam is achievable.

During the cutting, the controller 18 of the laser machining apparatus 100 controls the rotation mechanism 16 to maintain the angle Φ between the traveling-direction-of-the-laser beam 1 (D2) and the line extending from the optical axis 1a to the gap sensor 27 is less than 90 degrees. This configuration causes the gap sensor 27 to stay ahead of the machining point in the traveling-direction-of-the-laser beam 1 (D2). The gap sensor 27 is therefore capable of measuring the distance h at the flat portion where the cut groove 31 is not formed, so that the measurement error is suppressed.

Consequently, the laser machining apparatus 100 is capable of the highly accurate gap control and the high-speed and high-quality cutting.

The above configurations illustrated in the embodiment are illustrative of contents of the present invention, can be combined with other techniques that are publicly known and can be partly omitted or changed without departing from the gist of the present invention.

For example, the rotation mechanism 16, which in the first embodiment, uses the gear 25 for shifting the nozzle 15, may be driven by a belt. The hose 15a described in the first embodiment is long enough to allow the rotation of the nozzle 15; however, in place of the hose 15a, a rotary joint using a slidable seal member may be used for supplying the gas to the nozzle 15. The sensor cable 27a connected to the gap sensor 27 is similarly long enough to allow the rotation of the nozzle 15 in the first embodiment; however, a slip ring using a brush may be used in place of the sensor cable 27a.

In the first embodiment, the rotation mechanism 16 causes the nozzle 15 to rotate about the optical axis 1a. However, the present embodiment is not limited to this example. For example, the rotation mechanism 16 may cause the workpiece W to rotate about the optical axis 1a.

In the first embodiment, the workpiece W is the fiber reinforced composite material, with the reinforcing fibers being the carbon fibers Wa and with the matrix being the resin Wb, which is the thermosetting resin as represented by the epoxy resin. However, the present embodiment is not limited to this example. Instead of the carbon fibers Wa, silicon carbide (SiC) fibers, boron (B) fibers, or others may be the reinforcing fibers. A thermoplastic resin as represented by polyamide resin or polycarbonate resin may be the matrix instead of the thermosetting resin. The techniques described in the present embodiment are not limited to the fiber reinforced composite material and are also appropriate to other composite materials each including a plurality of materials of different thermal properties. The techniques described in the present embodiment are particularly highly effective for the composite materials but can be used in laser machining of not only the composite materials, but also other various materials.

REFERENCE SIGNS LIST 1 laser beam; 1a optical axis; 11 laser oscillator; 12 optical path; 13 machining head; 14 actuator; 15 nozzle; 16 rotation mechanism; 17 detector; controller; 21 converging lens; 22 optical unit; 23 frame; 24 bearing; 25 gear; 26 servomotor; 27 gap sensor; 28 remnant material; 29 machined product; 30 decomposition product; 31 cut channel; 32 cut end; 33 contact zone; 100 laser machining apparatus; 201 CPU 202 memory; 203 memory device; 204 display device; 205 input device; D1 squirting direction; D2 traveling direction; h distance; W workpiece; Wa carbon fiber; Wb resin; α, Ψ, θ, Φ angle.

The invention claimed is:

1. A laser machining apparatus to separate a workpiece into a machined product and a remnant material by cutting using laser beam irradiation, the laser machining apparatus comprising:
a nozzle to squirt gas at a machining point;
a gap sensor fixed to the nozzle and configured to detect a distance between the workpiece and the gap sensor;
a rotation mechanism including a servomotor and configured to cause one of the nozzle and the workpiece to rotate about an optical axis of a laser beam; and
a controller to perform control of the rotation mechanism, the controller causing the nozzle to squirt gas at an acute angle with respect to an optical axis of the laser beam toward the machining point from a side of the machined product during the cutting, wherein
an angle formed by a line extending from the optical axis to the nozzle and a line extending from the optical axis to the gap sensor is less than 90 degrees.

2. The laser machining apparatus according to claim 1, wherein during the cutting, the controller maintains an angle between a plane including the optical axis and a traveling direction of the laser beam and a plane including the optical axis and the gap sensor to be less than 90 degrees.

3. The laser machining apparatus according to claim 1, wherein the rotation mechanism causes one of the nozzle and the workpiece to rotate about an optical axis of the laser beam to thereby change a positional relationship between the nozzle and the workpiece.

4. The laser machining apparatus according to claim 1, wherein
the line extending from the optical axis to the nozzle is orthogonal to the optical axis, and
the line extending from the optical axis to the gap sensor is orthogonal to the optical axis.

5. The laser machining apparatus according to claim 1, further comprising:
a machining head including an optical unit, wherein
an end of the gas nozzle that squirts the gas is arranged below a lower end of the optical unit; and
the controller maintains constant a height of the optical unit above the workpiece based on the distance detected by the gap sensor.

6. The laser machining apparatus according to claim 1, wherein the nozzle is configured to squirt the gas at the machining point from a direction other than a direction of the optical axis.

7. The laser machining apparatus according to claim 1, wherein the rotation mechanism causes the nozzle to rotate about the optical axis of the laser beam at the machining point.

8. The laser machining apparatus according to claim 1, wherein the rotation mechanism causes the nozzle to rotate with respect to an optical unit that emits the laser beam.

9. The laser machining apparatus according to claim 1, wherein the controller performs the control of the rotation mechanism to cause the nozzle to squirt the gas toward the machining point from the side of the machined product during the cutting.

10. A laser machining apparatus to separate a workpiece into a machined product and a remnant material by cutting using laser beam irradiation, the laser machining apparatus comprising:
a nozzle to squirt gas at a machining point;
a gap sensor fixed to the nozzle and configured to detect a distance between the workpiece and the gap sensor, and the gap sensor is positioned on an upstream side of a gas flow compared with the machining point;
a rotation mechanism including a servomotor and configured to cause one of the nozzle and the workpiece to rotate about an optical axis of a laser beam; and
a controller to perform control of the rotation mechanism, the controller causing the nozzle to squirt gas at an acute angle with respect to an optical axis of the laser beam toward the machining point from a side of the machined product during the cutting.

* * * * *